J. F. BIRCHARD.
Sofa-Beds.

No. 147,359. Patented Feb. 10, 1874.

WITNESSES:
A. Schattenberg
Chas Fink

John F. Birchard
INVENTOR.

UNITED STATES PATENT OFFICE.

JOHN F. BIRCHARD, OF MILWAUKEE, WISCONSIN.

IMPROVEMENT IN SOFA-BEDS.

Specification forming part of Letters Patent No. 147,359, dated February 10, 1874; application filed September 8, 1873.

*To all whom it may concern:*

Be it known that I, JOHN F. BIRCHARD, of the city and county of Milwaukee, in the State of Wisconsin, have invented certain Improvements in Sofa-Beds, of which the following is a specification:

My invention consists in the construction and arrangement of a sofa, so that, by the use of sectional slides and levers and other device, hereinafter described, the section forming the back and seat may be thrown in position to form a bed that shall consist of the same upholstered parts when extended as in the position of a sofa, the length of the sofa being the width of the bed when in their respective forms.

Figure 1:
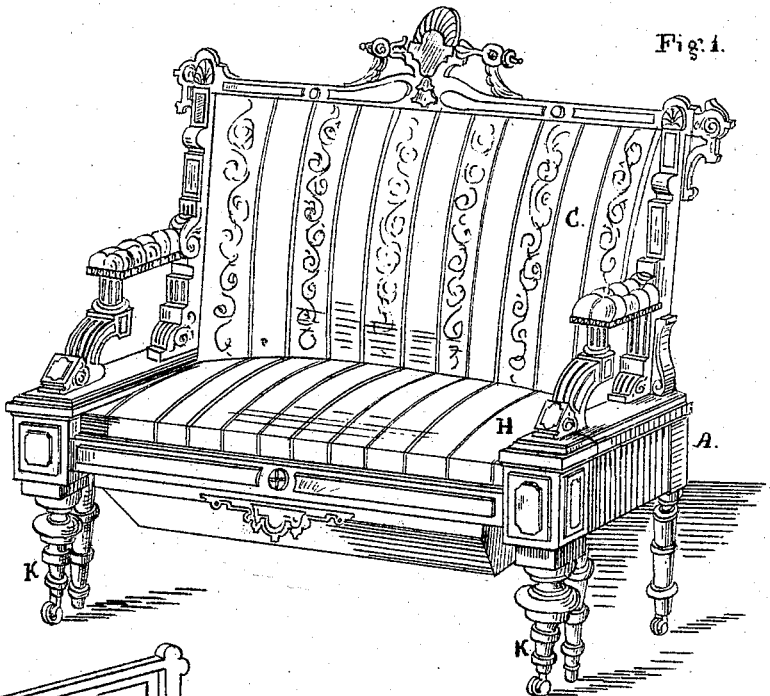
Figure 2:
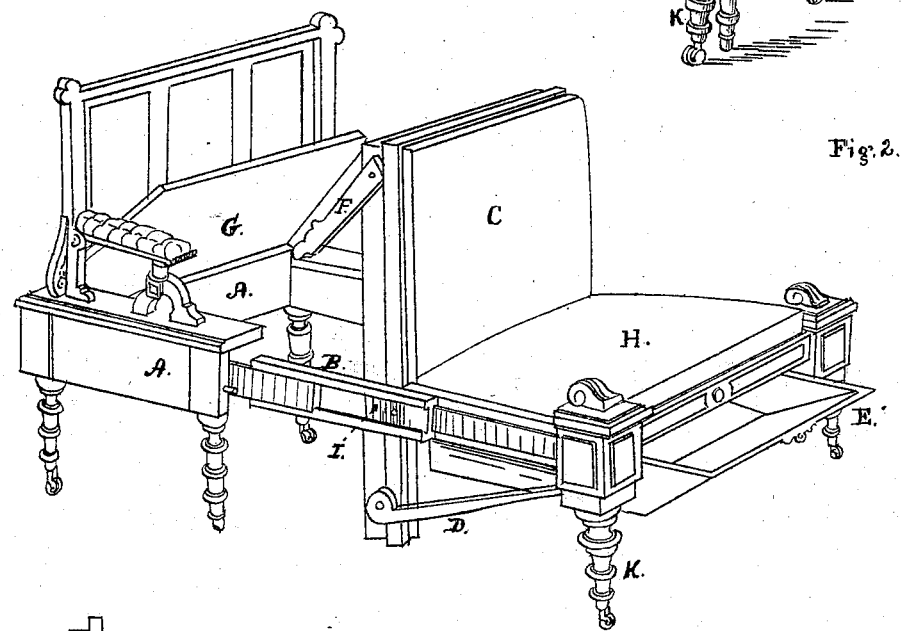
Figure 3:
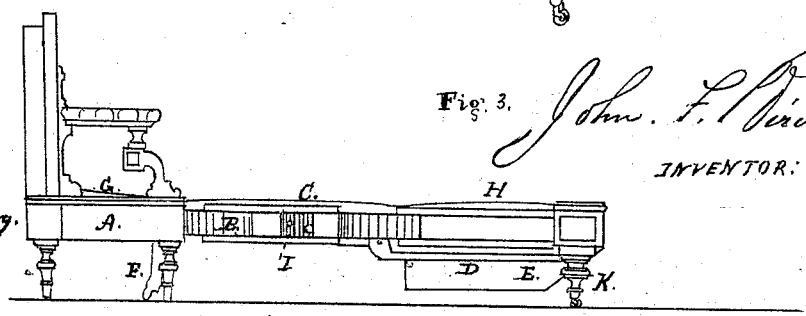

Figure 1 is a view of the sofa-bed when closed. Fig. 2 is the sections of the sofa-bed partly extended, the sofa-back remaining in an upright position; and Fig. 3, a sectional view of the bed when drawn out to the fullest extent and arranged for use.

A is the frame of the sofa proper. B is the sectional slides, by which the bed is slid in and out of the sofa-frame. C is the sofa-back, which is attached to the slides by a pin, and is drawn out, as shown in Fig. 2, and turned down so as to form part of the bed, as shown in sectional drawing, Fig. 3. D is a lever, one end of which is attached to the bottom of back C, and the other end attached to the leg supporting the seat, so that, as the back C is turned down from the position as shown in Fig. 2 to the position Fig. 3, the slides are farther extended, and the seat is thrown out so as to give room for the back C to lie flat. E is a drawer under the seat of sofa, which is shoved under the lower edge of and supports back C when thrown in position, as Fig. 3. F is a leg pivoted or hinged near the top of and supports back C when thrown in position, as Fig. 3. G is a board hinged to the case projecting back of the sofa, and when turned down, as in Fig. 3, adds to the length of the bed and forms a pillow-support. H is the seat of sofa. The back C and seat H are upholstered, and form the bed when in a horizontal position. The back C rests on, and is supported when in sofa form by, a pivot, I, attached to section of slides B, and is the fulcrum upon which back C operates. K K, legs which support the sofa-bed.

The operation of the sofa-bed is as follows: From the position of sofa, as in Fig. 1, pull out the seat H to the full extent of sectional slides B, thereby starting the lever D, which, attached to the back C, places it in a horizontal position, the legs F dropping and supporting the upper end of back C. Shove the drawer E under the lower edge of back C, and turn down the pillow-board G, as in Fig. 3. The cushioned or upholstered top of the sofa-seat H and the cushioned or upholstered front of the back C extend below the seat nearly to the floor, forming the top of the bed.

I claim as my invention—

1. The combination of frame A, slides B, back C, bar D, seat H, and pivot I, substantially as and for the purpose specified.

2. The combination of drawer E, seat H, back C, and slides B, substantially as described.

3. The combination of the frame A, seat H, the back C, and the slides B, constructed as and for the purposes described and shown.

JOHN F. BIRCHARD.

Witnesses:
 JONATHAN MAGIE,
 JOHN M. EWING.